United States Patent [19]

Krezak

[11] Patent Number: 4,493,141
[45] Date of Patent: Jan. 15, 1985

[54] METHOD OF JOINING SHEETS WITH A RIVET

[75] Inventor: John E. Krezak, Bellevue, Wash.
[73] Assignee: The Boeing Company, Seattle, Wash.
[21] Appl. No.: 460,065
[22] Filed: Jan. 21, 1983

Related U.S. Application Data

[62] Division of Ser. No. 218,819, Dec. 22, 1980.

[51] Int. Cl.$^3$ .................. B21D 39/00; B23P 11/00
[52] U.S. Cl. ................... 29/509; 29/522 A; 29/526 A; 403/408
[58] Field of Search ............ 29/509, 522 R, 526 R, 29/522 A, 526 A; 403/408, 405; 411/500, 504

[56] References Cited

U.S. PATENT DOCUMENTS

| | | | |
|---|---|---|---|
| 2,302,772 | 11/1942 | Huck | 29/509 |
| 3,359,847 | 12/1967 | Richmond | 411/500 |
| 3,526,032 | 9/1970 | Pipher | 29/509 |
| 3,680,429 | 8/1972 | Briles | 29/522 A X |
| 3,747,467 | 7/1973 | Rosman | 29/522 A X |
| 3,828,422 | 8/1974 | Schmitt | 29/522 A X |
| 3,840,980 | 10/1974 | Auriol | 29/522 A |
| 3,849,964 | 11/1974 | Briles | 403/408 |
| 4,000,680 | 1/1977 | Briles | 29/509 X |
| 4,048,708 | 9/1977 | Briles | 29/509 |
| 4,230,016 | 10/1980 | Merrell | 411/500 X |

FOREIGN PATENT DOCUMENTS 516848 12/1977 U.S.S.R. .

Primary Examiner—Charlie T. Moon
Attorney, Agent, or Firm—Eugene O. Heberer; Delbert J. Barnard

[57] ABSTRACT

A fatigue resistant rivet in which the head has a distal frusto-conical portion and a proximate frusto-conical portion relative to the shank thereof. The proximate portion has a conical surface with a smaller angle relative to the rivet axis than the conical surface of the distal portion.

A method of securing a fatigue resisting rivet to a work piece including the steps of first deforming the proximate portion to be pressure fit on a countersink to provide residual clamping strain/stress at the base of the countersink and deforming the distal portion to be pressure fit on the countersink to provide a residual claiming strain/stress adjacent the top of the countersink, and deforming the distal and proximate portions against the countersink to provide seal and clamp action between the rivet head and the countersink.

17 Claims, 2 Drawing Figures

METHOD OF JOINING SHEETS WITH A RIVET

This is a division of application Ser. No. 218,819, filed Dec. 22, 1980.

BACKGROUND OF THE INVENTION

This invention relates to fatigue resistant rivets and the method for securing relatively thin aircraft skins to stringers, for example, and the combination of the rivets in such skins in a fastening relationship.

Tapered fasteners have been widely used in aircraft construction, especially where fluid-sealing along the fastener and where improved fatigue life are desired in the shear joint. Numerous innovations have been provided in rivets to provide sealing and to improve the fatigue life. The prior art rivets have been improved to be satisfactory under certain conditions but in some of the rivets required close tolerances have increased their cost and in general there continues to be corrosion around the rivets because of leaks.

SUMMARY OF THE INVENTION

The present invention is a shallow-headed rivet in which the head has a distal frusto-conical portion and a proximate frusto-conical portion, with respect to the shank, the conical surface of the proximate portion having a smaller angle relative to the rivet axis than the conical surface of the distal portion. The invention further includes the method of firstly, elastically deforming the proximate frusto-conical portion to be pressure fit onto a countersink to provide residual clamping strain/stress at the base of the countersink, secondly, deforming the distal portion to be pressure fit on the countersink to provide residual clamping strain/stress adjacent the top of the countersink, and thirdly, forming both the distal and proximate portions against the countersink to provide a seal between the head of the rivet and the countersink.

Accordingly, it is an object of the present invention to provide an improved rivet to accomplish the foregoing without adding the cost associated with close tolerances required in prior art rivets.

It is another object of the invention to provide elimination of close tolerance requirements by the use of conventional countersinks without additional counterbores. In the prior art second counterbores have been employed to provide shallower countersinks to increase the bearing length of the work piece just inwardly of the head. The present invention provides a shallow countersink and an increased bearing length along the shank without the need of a second counterbore and without the close tolerances it requires.

It is still another object of the invention to provide a rivet in which clamping force is used to distribute friction at the faving surfaces to improve fatigue life of the rivet. The distribution of the friction occurs as a result of the deformation of the rivet against the countersink so as to avoid stress concentrations.

It is a further object of the invention to provide a rivet, as described in the preceding paragraphs, and a method of installation and structural deformation thereof which provides a tight seal along the countersink surface. The seal prevents water passage and filiform corrosion.

It is a still further object of the invention to provide a rivet, as described in the preceding paragraphs, that is elastically deformed during installation so as to provide the aforesaid seal and so as to provide clamping action which results in a residual clamp stress at the outer edge of the rivet head and the countersink and at the head at the countersink also provides additional friction between two work pieces being fastened together.

It is another object of the invention to provide a rivet, as described in the preceding paragraphs, in which fatigue life of the rivet is improved without distortion of aircraft thin skin and stringer construction.

It is still another object of the invention to provide a rivet, as described in the preceding paragraphs, in which aluminum alloy commonly used can be employed in rivets in relatively low shear load applications. In the prior art where shallower heads have been possible, 7050 alloy has been required in contrast to 2017 alloy.

It is a further object of the invention to provide a rivet, as described in the preceding paragraphs, in which the head height is not critical in that there is a crown to allow seating without skin damage.

It is a still further object of the invention to provide a rivet, as described in the preceding paragraphs, in which there is residual interference on the base of the countersink from driving an 86 degree rivet into a 90 degree countersink.

It is another object of the invention to provide a rivet, as described in the preceding paragraphs, in which fatigue life has been improved on the order of two to three times that of the prior art rivets.

Further objects and advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings, which are for illustrative purposes.

DESCRIPTION OF THE PREFERRED EMBODIMENT

Referring again to the drawings, there is shown a rivet, generally designated as 10, having a radiused crown 12, forming an outer part of the head. Inwardly of the crown is a cylindrical edge 14.

Figure 2:
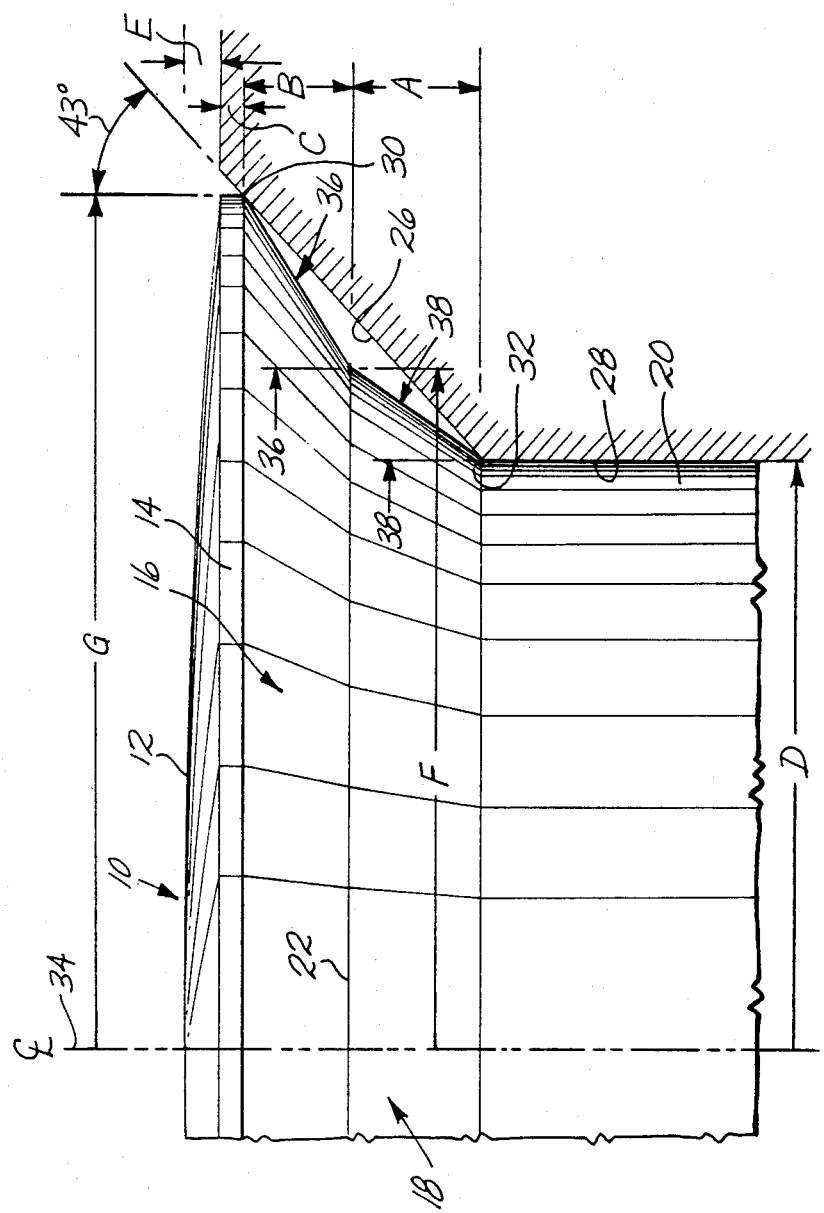
FIG. 2 is a fragmentary detailed view of the rivet according to the invention.

The rivet, as made and unfastened, is shown in FIG. 2. Below the cylindrical edge 14 and with respect to the shank, there is a distal frusto-conical portion, generally designated as 16, and a proximate frusto-conical portion 18, terminating inwardly at the shank 20. A common diameter 22 extends between the conical surfaces 16 and 18.

In FIG. 2 the rivet 10 is resting in a 90 degree countersink having a conical surface 26. Inwardly of the countersink is a cylindrical bore 28. The angle between the outer conical edge 30 of the rivet and the base 32 of the countersink or the top of the shank is 43 degrees, as indicated, and thus, the angle of the rivet head is 86 degrees, adapted to fit in a 90 degree countersink.

The angle between the distal conical surface 16 and the rivet axis, as indicated by center line 34, is indicated by the arrows 36 and the angle of the proximate conical surface relative to the axis is indicated by the arrows 38. The angle between the arrows 36 is always larger than the angle between the arrows 38. A desirable angle between the arrows 36 is about 51.5 degrees and a desirable corresponding angle between the arrows 38 is about 34.5 degrees. The range of the angle between the arrows 36 for a 90 degree countersink varies between about 53 degrees to 40 degrees and the angle between the arrows 38 for the same countersink may vary between 30 degrees and 42 degrees.

The diameters of the head, indicated by G and F, are directly proportional to the diameter D of the shank. Thus, the ratio of the longest distal portion diameter G to the shank diameter D is approximately 1.36. Similarly, the ratio of the common diameter F to the shank diameter D is approximately 1.14. The ratio of the shank diameter to the axial length A+B+C is also directly proportional, namely, about 4.45. Thus, for a 3/16" diameter rivet, the diameter D is 0.188, the diameter G is 0.255, and the axial length of the conical part of the head A+B is 0.036", A being equal to 0.022" and B being 0.014". The axial length C for all rivets according to the invention is typically 0.006". The axial length E of the height of the dome 12 may be 0.006"+10% and thus, the tolerance requirement is not close.

Figure 1:
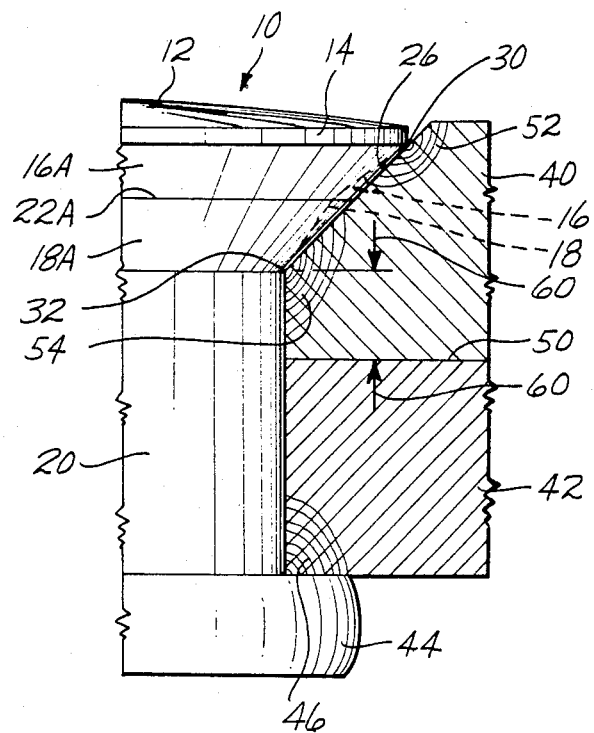
FIG. 1 is an elevational view of a rivet, according to the invention, installed as a fastener between two plates.

The rivet 10 is installed to appear as shown in FIG. 1, between two relatively thin skins 40 and 42 which, respectively, may be the outer skin of the aircraft and a stringer. The general method of installation is conventional in which a driver is applied to the dome 12 and an anvil is applied to an extension of the shank 20, which below the plate 42 is upset to form the portion 44, tightly in abutment with the plate 42.

The installation is different from the conventional in that the conical portions of the rivet head are elastically deformed to closely fit on the countersink 26 and form a seal therewith. The proximate conical portion 18 is first deformed so that its surface is moved against the countersink and then the distal surface is moved against the countersink to form an installed rivet, having a continuous conical surface comprised of a deformed distal portion 16A, and a deformed proximate portion 18A, having an elongated common diameter 22A.

The structure of the rivet 10, as installed as shown in FIG. 1, substantially enhances the fatigue life on the order of two or three times that of the prior art rivets. The fatigue life is enhanced by the provided residual interference and clamping strain/stress 54 at the base 32 of the countersink, at the top 52 of the countersink, and inwardly of the upset end at 46, the latter occurring with a conventional rivet. The clamping force acting to elastically deform the conical surface of the proximate and then the distal portions of the head distributes friction at the faying surfaces so as to improve fatigue life. This occurs because the movement of the rivet against the countersink provides friction from clamping force between the two plates, as at 50.

The clamping action at 30 promotes a positive seal between the rivet and the countersink to prevent water passage and filiform corrosion along the rivet and countersink which is typical in the prior art. The present invention provides excellent visual inspection of seating for forming the seal.

The present invention, as shown in FIG. 1, substantially increases the bearing area indicated by the arrows 60 along the shank so as to improve fatigue life of the rivet. This results from the relatively shallow head of the present invention, made possible by the clamping action due to the deformation. That is, a typical conical head for a 3/16" rivet has an axial length of approximately 0.048" in contrast to the axial length of A+B of 0.036" for the present invention in a 3/16" rivet.

In the prior art, rivet heads have been axially shortened where the countersinks are formed by an outer cylindrical bore and an inner frusto-conical bore. Thus, two bores must be drilled and in addition very close tolerances are required. For example, in the cylindrical bore the tolerance must be within 0.001" and the axial head tolerance outwardly of the cylindrical portion of the rivet above the frusto-conical portion is limited to 0.004". These close tolerances result in a 30% rejection in hand-driven rivets, hand-driven rivets being from 10 to 20% of the total required. This is in contrast to a 2% rejection for the present invention. Tolerances are not close in the present invention. The present fatigue resistant rivet has all the advantages of the prior art rivets but without the increased cost of close tolerances.

Also, in contrast to some of the prior art rivets, the radiused crown 12 allows seating without impacting on aircraft fuselage or empennage skins during the upset formation, as 44. Further, with the shallow head, the fatigue is improved without distortion of a thin outer skin and a thin stringer construction. In relatively lower shear load applications aluminum alloys that are commonly used can be also used in the present invention.

The invention and its attendant advantages will be understood from the foregoing description and it will be apparent that various changes may be made in the form, construction, and arrangements of the parts of the invention without departing from spirit and scope thereof or sacrificing its material advantages, the arrangements hereinbefore described being merely by way of example. I do not wish to be restricted to specific forms shown or uses mentioned except as defined in the accompanying claims.

What is claimed is:

1. The method of fastening at least two work pieces with a fatigue resistant and sealing rivet, wherein one work piece has a shallow frusto-conical countersink to receive the rivet head, the countersink terminating in a generally cylindrical bore to receive the rivet shank, the method comprising:

inserting a rivet shank into the bore and a rivet head into the countersink of the one work piece and inserting the rivet shank into a bore of a second work piece so that a shank end extends beyond the second work piece;

the rivet head having a distal frusto-conical portion and a proximate frusto-conical portion relative to said shank;

said proximate portion having a conical surface at a smaller angle relative to the shank axis than the conical surface of said distal portion relative to said axis;

the axial length of the proximate portion being slightly greater than the axial length of the distal portion;

said distal and proximate portions being adjoined at a common diameter;

said common diameter being the largest diameter of said proximate portion and the smallest diameter of said distal portion; and exerting forces on the rivet head and shank end to upset the shank end on the second work piece and to deform the proximate and distal portions radially along the common diameter and both sides thereof to form a continuous conical surface in pressure relationship with a continuous conical countersink surface.

2. The method according to claim 1 including:
first deforming the proximate portion to be pressure fit on the countersink to provide residual clamping strain/stress at the base of the countersink; and
second deforming the distal portion to be pressure fit on the countersink to provide residual clamping strain/stress adjacent the top of the countersink.

3. The method according to claim 1 including:
deforming the distal and proximate portions against the countersink to provide a seal and clamp action between the head and countersink.

4. The method according to claim 1 including:
a cylindrical edge portion of said head extending axially outwardly from said distal conical portion, said cylindrical edge portion being very short axially compared with said conical portions and having the largest diameter of said distal portion;
the largest diameter of said distal portion, the axial length of the head including the conical and cylindrical edge portions, and the common diameter are substantially directly, proportional to the diameter of the shank;
said cylindrical edge portion has an axial length of about 0.006".

5. The method according to claim 4 in which:
the ratio of the longest distal portion diameter to the shank diameter before deformation was approximately 1.36; and
the ratio of the shank diameter to the axial length of the head including the conical portions and a cylindrical edge adjoining an outer end of the distal conical portion is approximately 4.45.

6. The method according to claim 1 in which:
the angle of the conical surface of the proximate portion relative to the axis before deformation was in the approximate range of 30° to 42° for a 90° countersink; and
the angle of the conical surface of the distal portion relative to the axis before deformation was in the approximate range of 53° to 40° for a 90° countersink.

7. The method according to claim 1 in which:
the angle of the conical surface of the proximate portion relative to the axis before deformation was about 34.5°, and the angle of conical surface of the distal portion relative to the axis before deformation was about 51.5°.

8. The method according to claim 4 in which:
the head has a convex dome having an axial length about equal to the axial length of the cylindrical edge portion and has a tolerance of about +10%.

9. The method according to claim 1 in which:
the axial length of the proximate portion before deformation was about 0.004" greater than half the length of both portions; and the axial length of the distal portion before deformation was about 0.004" less than half the length of both portions.

10. The method according to claim 2 in which:
the residual clamping strain/stress on the countersink distributes friction at the faying surfaces of the work pieces so as to improve fatigue life of the rivet.

11. The method according to claim 2 in which:
the residual clamping strain/stress on the countersink increases the bearing length along the shank and the one work piece between the countersink and the faying surfaces between the work pieces.

12. A method according to claim 1 including:
a cylindrical edge portion of said head extending axially outwardly from said distal conical portion, said cylindrical edge portion being very short axially compared with said conical portions and having the largest diameter of said distal portion.

13. A method according to claim 12 in which:
the largest diameter of said distal portion, the axial length of the head including the conical and cylindrical edge portions, and the common diameter are substantially directly proportional to the diameter of the shank.

14. A method according to claim 12 in which:
the cylindrical edge portion has an axial length of about 0.006".

15. A method according to claim 12 in which:
said cylindrical edge portion for a 3/16" rivet has an axial length equal to about 1/6 the axial length of the total of the proximate and distal conical portions.

16. A method according to claim 14 in which:
the head has a convex dome having an axial length about equal to the axial length of the cylindrical edge portion and has a tolerance of about +10%.

17. A method according to claim 1 in which:
the head has convex dome.

* * * * *